(12) United States Patent
Zhang et al.

(10) Patent No.: US 12,199,250 B2
(45) Date of Patent: Jan. 14, 2025

(54) BATTERY MODULE

(71) Applicant: CONTEMPORARY AMPEREX TECHNOLOGY (HONG KONG) LIMITED, Hong Kong (CN)

(72) Inventors: Chong Zhang, Fujian (CN); Zonghui Chen, Fujian (CN); Jianhua Liu, Fujian (CN); Renwei Zheng, Fujian (CN); Shaozhen Chen, Fujian (CN); Jun Liu, Fujian (CN); Jihua Yao, Fujian (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 542 days.

(21) Appl. No.: 17/591,164

(22) Filed: Feb. 2, 2022

(65) Prior Publication Data

US 2022/0158256 A1    May 19, 2022

Related U.S. Application Data

(63) Continuation of application No. PCT/CN2020/104709, filed on Jul. 26, 2020.

(30) Foreign Application Priority Data

Aug. 5, 2019  (CN) .......................... 201921256473.2

(51) Int. Cl.
 *H01M 10/42*    (2006.01)
(52) U.S. Cl.
 CPC .. *H01M 10/425* (2013.01); *H01M 2010/4278* (2013.01); *H01M 2220/20* (2013.01)
(58) Field of Classification Search
 CPC ....... H01M 10/425; H01M 2010/4278; H01M 2220/20; H01M 50/507; H01M 50/519; Y02E 60/10

See application file for complete search history.

(56) References Cited

U.S. PATENT DOCUMENTS 10,424,947 B2    9/2019   Chiyajo et al.
2018/0233930 A1  8/2018   Chiyajo et al.

FOREIGN PATENT DOCUMENTS

CN    202308431 U    7/2012
CN    203644857 U    6/2014
(Continued)

OTHER PUBLICATIONS

Extended European Search Report dated Jul. 1, 2022 received in European Patent Application No. EP 20850711.11.
(Continued)

*Primary Examiner* — Helen Oi K Conley
(74) *Attorney, Agent, or Firm* — Scully, Scott, Murphy & Presser, P.C.

(57) ABSTRACT

The present application provides a battery module, which includes a plurality of batteries, an electrical connecting piece, a circuit board and a sampling connecting member. The plurality of batteries are arranged in a longitudinal direction; the electrical connecting piece is electrically connected to the corresponding battery; the circuit board is located above the corresponding battery in a height direction; the sampling connecting member is connected to the electrical connecting piece and the circuit board; the sampling connecting member includes a fixing portion and a contact portion, the fixing portion being fixed on the circuit board, the contact portion being connected to the fixing portion, and the contact portion pressing against the electrical connecting piece and keeping in contact with the electrical connecting piece.

10 Claims, 4 Drawing Sheets

(56) References Cited

FOREIGN PATENT DOCUMENTS

| | | |
|---|---|---|
| CN | 107403899 A | 11/2017 |
| CN | 207818728 U | 9/2018 |
| CN | 109546066 A | 3/2019 |
| CN | 109659728 A | 4/2019 |
| CN | 210136942 U | 3/2020 |
| CN | 210136984 U | 3/2020 |
| JP | 2011205732 A | 10/2011 |

OTHER PUBLICATIONS

International Search Report dated Nov. 4, 2020 issued in PCT/CN2020/104709.

BATTERY MODULE

CROSS-REFERENCE TO RELATED APPLICATIONS

The present application is a continuation of International Application No. PCT/CN2020/104709, filed on Jul. 26, 2020, which claims priority to Chinese Patent Application No. 201921256473.2, filed to the Chinese Patent Office on Aug. 5, 2019 and entitled "BATTERY MOUDLE", the entire content of both of which are incorporated herein by reference.

TECHNICAL FIELD

The present application relates to the field of power batteries, and in particular, to a battery module.

BACKGROUND

A current battery module that uses a circuit board such as a PCB board usually samples and transmits information by a wire harness and the PCB board. The assembly process is complicated, and the sampling process needs several transmission passing through an electrode terminal of a battery, the wire harness, a sheath and the like, resulting poor reliability. A sampling structure for sampling by the wire harness has the following disadvantages: 1) the structure is complicated, and a wire groove, a buckle and other fixed wire harnesses and sheaths need to be designed; 2) the assembly is complicated, a trend location of the wire harness needs to be considered during assembly, the wire harness is arranged and fixed, and then the wire harness and each electrical connecting piece are welded or fixed by dispensing, which increase the assembly time, and in addition, there is also a risk of the wire harness breakage; 3) the reliability is poor, when the battery module expands, there is a risk of fracture at a sampling point where the wire harness is fixed with each electrical connecting piece.

SUMMARY

In view of the defects in prior art, the purpose of the embodiments of the present application is to provide a battery module that simplifies the assembly of a sampling structure and solves the problem that a sampling point at an electrical connecting piece is easily broken due to the expansion of the battery module.

To achieve the foregoing objectives, the present application provides a battery module, which includes a plurality of batteries, an electrical connecting piece, a circuit board and a sampling connecting member. The plurality of batteries are arranged in a longitudinal direction; the electrical connecting piece is electrically connected to the corresponding battery; the circuit board is located above the corresponding battery in a height direction; the sampling connecting member is connected to the electrical connecting piece and the circuit board; the sampling connecting member includes a fixing portion and a contact portion, the fixing portion being fixed on the circuit board, the contact portion being connected to the fixing portion, and the contact portion pressing against the electrical connecting piece and keeping in contact with the electrical connecting piece.

In an embodiment, the contact portion presses against an upper surface of the electrical connecting piece in the height direction.

In an embodiment, the sampling connecting member further includes a buffer portion, which is connected between the fixing portion and the contact portion, and the buffer portion bends and extends from the fixing portion towards the electrical connecting piece.

In an embodiment, the buffer portion obliquely bends down and extends from the fixing portion towards the electrical connecting piece.

In an embodiment, at least a portion of the buffer portion bends into an arc shape that protrudes in a direction away from the circuit board.

In an embodiment, a lower surface of the contact portion in the height direction forms a first protrusion protruding downward, which is in contact with the electrical connecting piece.

In an embodiment, the fixing portion includes a fixing segment and a connecting segment, the connecting segment is located between the buffer portion and the fixing segment, and a thickness of the fixing segment in a circumferential direction is greater than a thickness of the connecting segment in the circumferential direction.

In an embodiment, the fixing segment extends from the connecting segment and folds back in the height direction.

In an embodiment, the fixing segment forms a second protrusion protruding downward.

In an embodiment, the circuit board is configured with a through hole penetrating in the height direction; the second protrusion of the fixing portion is inserted and fixed in the through hole of the circuit board.

Another aspect of the present application provides an apparatus including the battery module according to any of the above embodiments, wherein the battery module is adapted to provide power for the apparatus.

Figure 1:
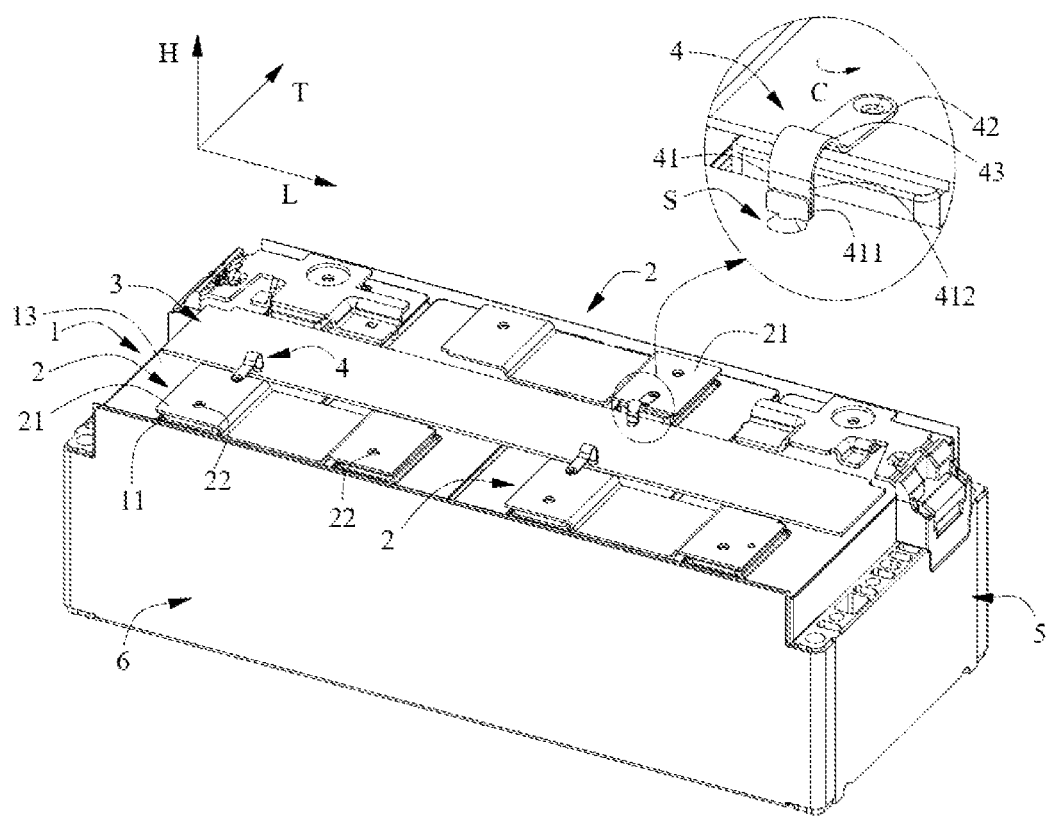
FIG. 1 is a perspective view of a battery module of the present application.

Reference signs are explained as follows:

| | |
|---|---|
| 1 battery | 411a second protrusion |
| 11 electrode terminal | 412 connecting segment |
| 12 anti-explosion valve | 42 contact portion |
| 13 top cover | 421 lower surface |
| 14 electrode assembly | 422 first protrusion |
| 2 electrical connecting piece | 43 buffer portion |
| 21 upper surface | 5 end plate |
| 22 electrode terminal hole | 6 side plate |

-continued

Reference signs are explained as follows:

| | |
|---|---|
| 3 circuit board | L longitudinal direction |
| 31 through hole | T transverse direction |
| 4 sampling connecting member | C circumferential direction |
| 41 fixing portion | H height direction |
| 411 fixing segment | S solder |

DESCRIPTION OF EMBODIMENTS

The accompanying drawings show embodiments of the present application, and it will be understood that the disclosed embodiments are merely examples of the present application, and the present application can be implemented in various forms. Therefore, the specific details disclosed herein should not be construed as limiting, instead, it is only used as the basis of the claims and as an indicative basis for teaching those skilled in the art to implement the present application in various ways.

In the description of the present application, unless otherwise specified or illustrated, the term "connection" should be understood broadly, for example, the "connection" can either be a fixed connection, or a detachable connection, or an integrated connection, or an electrical connection, or a signal connection; and the "connection" may either be a direct connection, or an indirect connection through an intermediary. Those of ordinary skilled in the art may appreciate the specific meanings of the foregoing terms in the present application according to specific circumstances.

In the description of the specification, it should be understood that the directional terms representing directions such as "up" and "down" described in the embodiments of the present application are described from the angles shown in the accompanying drawings, and should not be understood as limitation on the embodiments of the present application.

The battery module according to the present application is hereinafter described in detail with reference to the accompanying drawings.

With reference to FIGS. 1 to 8, the battery module of the present application includes a plurality of batteries 1, an electrical connecting piece 2, a circuit board 3, and a sampling connecting member 4. The plurality of batteries 1 are arranged in a longitudinal direction L; the electrical connecting piece 2 is electrically connected to the corresponding battery 1; the circuit board 3 is located above the corresponding battery 1 in a height direction H; the sampling connecting member 4 is connected to the electrical connecting piece 2 and the circuit board 3; the sampling connecting member 4 includes a fixing portion 41 and a contact portion 42, the fixing portion 41 is fixed to the circuit board 3, the contact portion 42 is connected to the fixing portion 41, and the contact portion 42 presses against the electrical connecting piece 2 and keeps in contact with the electrical connecting piece 2.

In the battery module of the present application, the sampling structure formed by the connection of the sampling connecting member 4 with the electrical connecting piece 2 and the circuit board 3 eliminates the use of the wire harness and the sheath in the known technology, making the assembly simple and easy to operate. The fixing portion 41 of the sampling connecting member 4 is fixed to the circuit board 3, the contact portion 42 and the electrical connecting piece 2 are in non-fixed contact in a press-against manner, and a sampling point is formed between the contact portion 42 and the electrical connecting piece 2. When the battery module expands, the sampling connecting member 4 can follow the expansion of the battery 1 to slide freely on a contact surface of the sampling connecting member 4 and the battery 1, and adjust the height autonomously following the up and down vibration of the battery module, thereby solving the problem that the sampling point at the electrical connecting piece 2 is easily broken due to the expansion of the battery module. In addition, when the battery module is subjected to an external impact, the configuration of the sampling connecting member 4 can also avoid the impact damage to the sampling point during the vibration of the battery module, and prevent the sampling process from failing.

Figure 4:
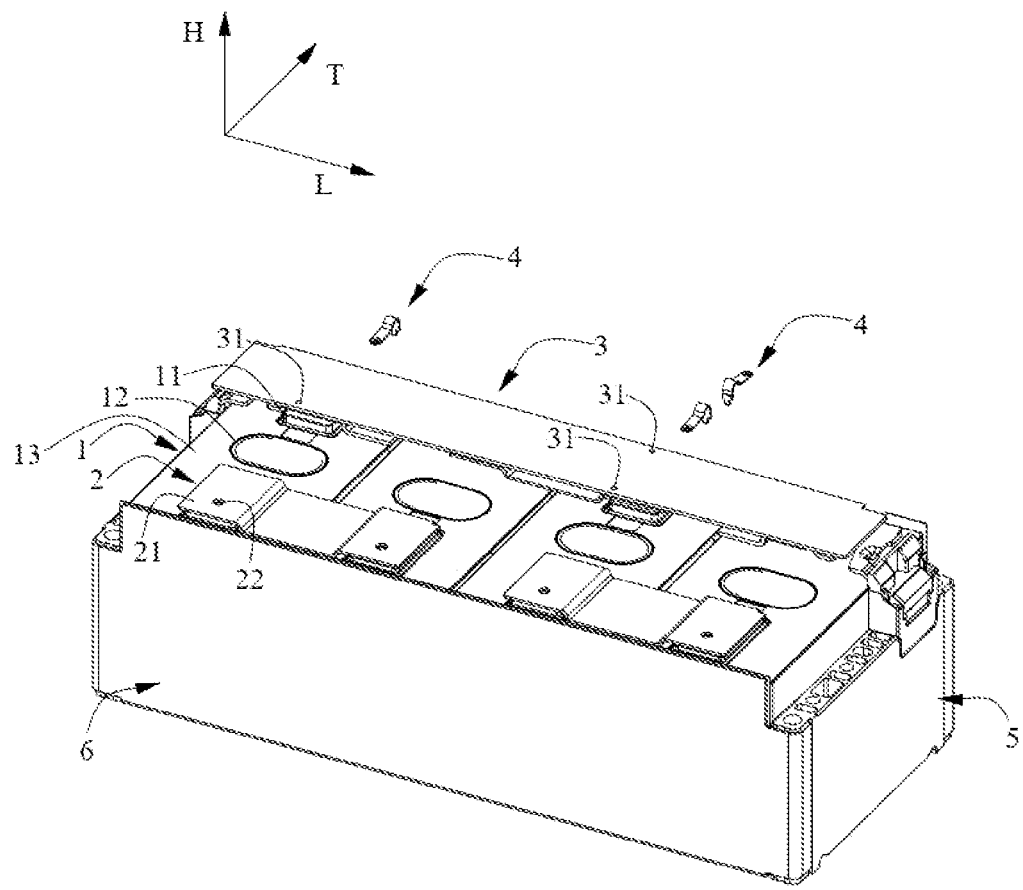
FIG. 4 is a partial perspective exploded view of the battery module of the present application.
Figure 5:
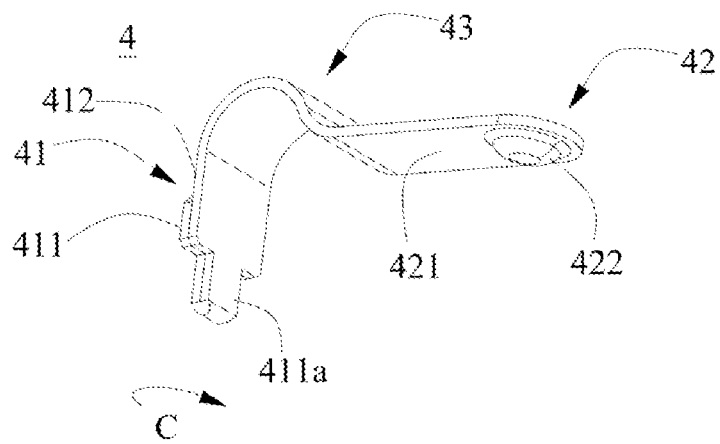
FIG. 5 is a perspective view of one angle of a sampling connecting member of the battery module of the present application.
Figure 6:
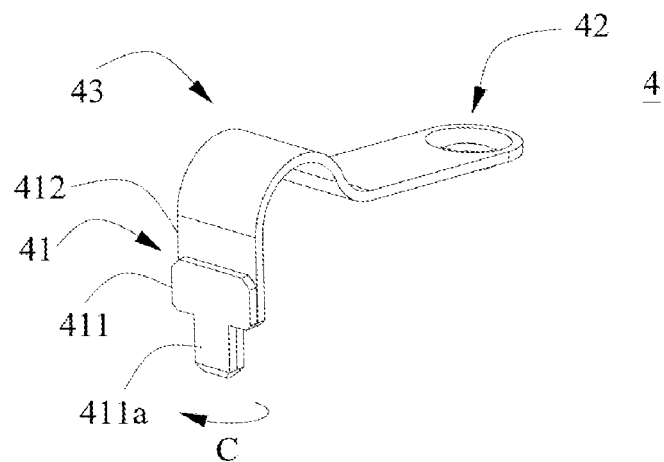
FIG. 6 is a perspective view of another angle of the sampling connecting member of the battery module of the present application.
Figure 7:
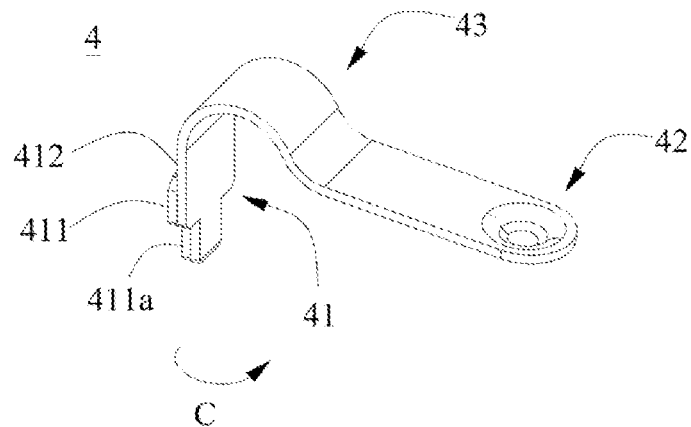
FIG. 7 is a perspective view of another angle of the sampling connecting member of the battery module of the present application.
Figure 8:
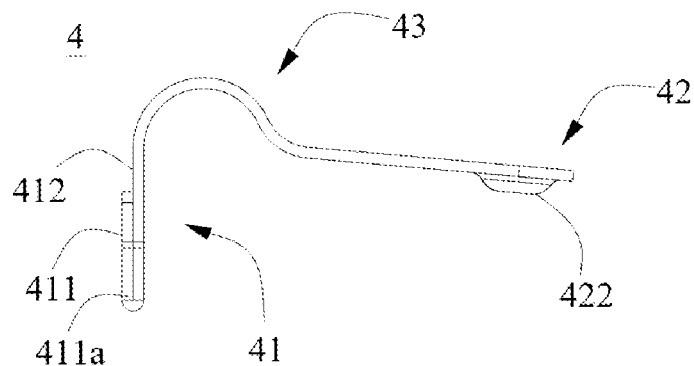
FIG. 8 is a perspective view of another angle of the sampling connecting member of the battery module of the present application.

With reference to FIG. 4, each battery 1 includes electrode terminals 11 extending in the height direction H with an opposite polarity, the electrode terminals 11 with the opposite polarity are located on a same side or an opposite side in the height direction H of the battery 1; and the electrical connecting piece 2 is electrically connected to the electrode terminal 11 of the corresponding battery 1. The battery 1 of the battery module can be a hard housing battery (or referred to as a can-type battery) or a soft pack battery (or referred to as a pouch-type battery). The hard housing battery includes the electrode terminal 11, an anti-explosion valve 12, a top cover 13 and an electrode assembly, a housing, a liquid injection hole, and the like. An accommodating cavity is formed inside the housing to accommodate the electrode assembly and electrolyte. The electrode assembly includes a positive electrode plate, a negative electrode plate and an isolation film separating the positive electrode plate and the negative electrode plate. The electrode assembly can wind the positive electrode plate, the negative electrode plate and the isolation film into a shape or stack the positive electrode plate, the negative electrode plate and the separator in to a shape. Both the positive electrode plate and the negative electrode plate include a current collector and an active material layer disposed on the current collector. The soft pack battery includes a package (for example, formed of aluminum plastic film), an electrode assembly (similar to the structure and molding of a hard housing battery) and a tab. A portion of the tab is enclosed in the package and the other portion extend out of the package. The tab can be directly formed with pole plates or using independent conductive materials and being electrically connected to the current collector. The electrical connecting piece 2 is electrically connected to the tab of the corresponding pouch battery.

In the battery module of the present application, the plurality of batteries 1 are connected in series and/or in parallel by the electrical connecting piece 2, and the structure and shape of the electrical connecting piece 2 can be designed according to the specific requirements of the battery module to reduce the design difficulty and process difficulty of the electrical connecting piece 2 and the battery module. With reference to FIGS. 1 to 4, according to the number of battery 1, there are a plurality of electrical connecting pieces 2. The number of the electrical connecting piece 2 can also be one, for example, all the batteries 1 are electrically connected together.

In the battery module of the present application, the circuit board 3 is configured to sample the temperature and voltage of the battery 1 to control the performance of the battery 1 and improve the safety of the battery module. As shown in FIGS. 1 to 4, the shape of the circuit board 3 is a rectangular plate, but it is not limited to this, and the structure and shape of the circuit board 3 can be designed according to the specific requirements of the battery module. The circuit board 3 can be a flexible printed circuit board (FPC for short).

With reference to FIGS. 1, 3, and 5 to 8, the fixing portion 41 is fixed to the circuit board 3, which is firm, reliable and easy to operate. The fixing portion 41 can be fixed to the circuit board 3 with solder S by means of tin soldering. The fixing portion 41 includes a fixing segment 411 and a connecting segment 412. The connecting segment 412 is located between a buffer portion 43 and the fixing segment 411, and a thickness of the fixing segment 411 in a circumferential direction C is greater than a thickness of the connecting segment 412 in the circumferential direction C, to strengthen the fixing strength of the fixing segment 41 to the circuit board 3. Specifically, the fixing segment 411 extends from the connecting segment 412 and folds back in the height direction H, so that to make the thickness of the fixing segment 411 in the circumferential direction C is greater than the thickness of the connecting segment 412 in the circumferential direction C, the thickness of the fixing segment 411 in the circumferential direction C is increased by the way of folding back, which can simplify the manufacturing process.

As shown in FIGS. 5 to 8, the fixing segment 411 forms a second protrusion 411a protruding downward, and the second protrusion 411a is used for fastening the fixing portion 41 and the circuit board 3. Specifically, the circuit board 3 is configured with a through hole 31 penetrating in the height direction H; the second protrusion 411a of the fixing portion 41 is inserted and fixed in the through hole 31 of the circuit board 3, which can play a limit role on the sampling connecting member 4 and be reliably fixed.

With reference to FIGS. 3 and 5 to 8, a lower surface 421 of the contact portion 42 in the height direction H forms a first protrusion 422 protruding downward, and the first protrusion 422 is in contact with the electrical connecting piece 2, which contributes to the reliability of the contact portion 42 in connection with the electrical connecting piece 2. The first protrusion 422 is formed into a shape concave on one side and convex on the other side by punching and molding the contact portion 42, and the first protrusion 422 formed by punching and molding is easy to manufacture with high precision and low production cost.

As shown in FIGS. 1 to 4, in some embodiments, in the sampling connecting member 4 of the battery module of the present application, the contact portion 42 presses against an upper surface 21 of the electrical connecting piece 2 in the height direction H, because there is a sufficiently large contact area on the upper surface 21, which can ensure that the contact portion 42 is always in contact with the electrical connecting piece 2. The contact portion 42 may also press against the connecting piece 2 along the side of transverse direction T or along the side of the longitudinal direction L.

With reference to FIG. 1 to FIG. 4, the fixing portion of the sampling connecting member 4 is fixed to the circuit board 3, the contact portion 42 and the electrical connecting piece 2 are in non-fixed contact in a press-against manner, and the sampling point is formed between the contact portion 42 and the electrical connecting piece 2. Taking the contact portion 42 pressing against the upper surface of the electrical connecting piece 2 in the height direction H as an example, the sampling connecting member 4 can slide freely within a certain angle in the longitudinal direction L, and can adjust the height in the height direction H autonomously, when the battery module expands, the sampling connecting 4 can freely slide within a certain angle in the longitudinal direction L as the battery 1 expands and discharges, and adjust its height autonomously as the battery module vibrates in the height direction H, thereby it can solve the problem that the sampling point at the electrical connection piece 2 is easily broken due to the expansion of the battery module.

With reference to FIGS. 1 to 3 and 5 to 8, the sampling connecting member 4 further includes the buffer portion 43, the buffer portion 43 is connected between the fixing portion 41 and the contact portion 42, and the buffer portion 43 bends and extends from the fixing portion 41 toward the electrical connecting piece 2. The buffer portion 43 can absorb the vibration of the battery module caused by the external impact, and play the role of buffer.

Figure 2:
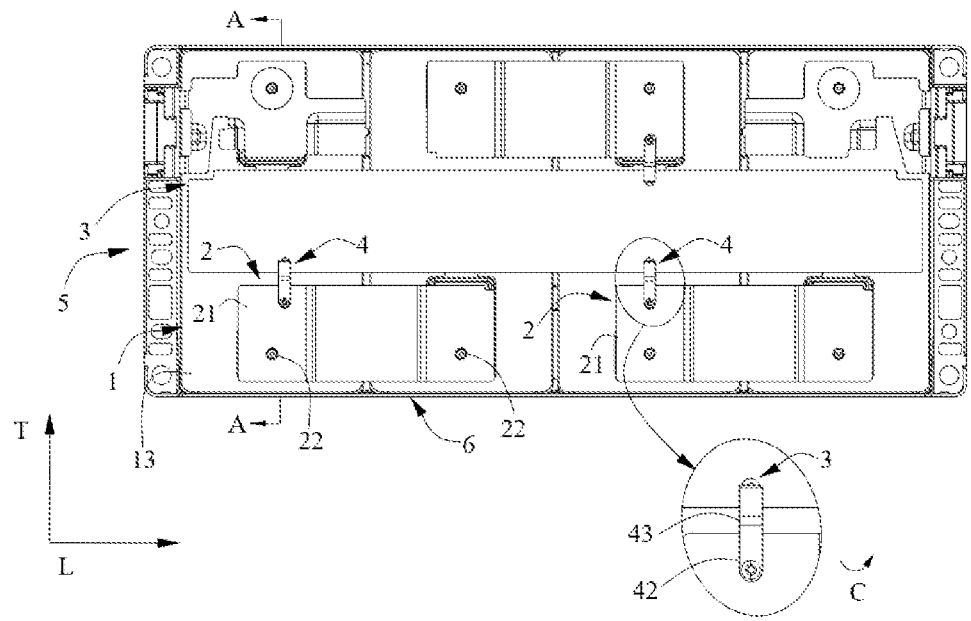
FIG. 2 is a top view of the battery module of the present application.
Figure 3:
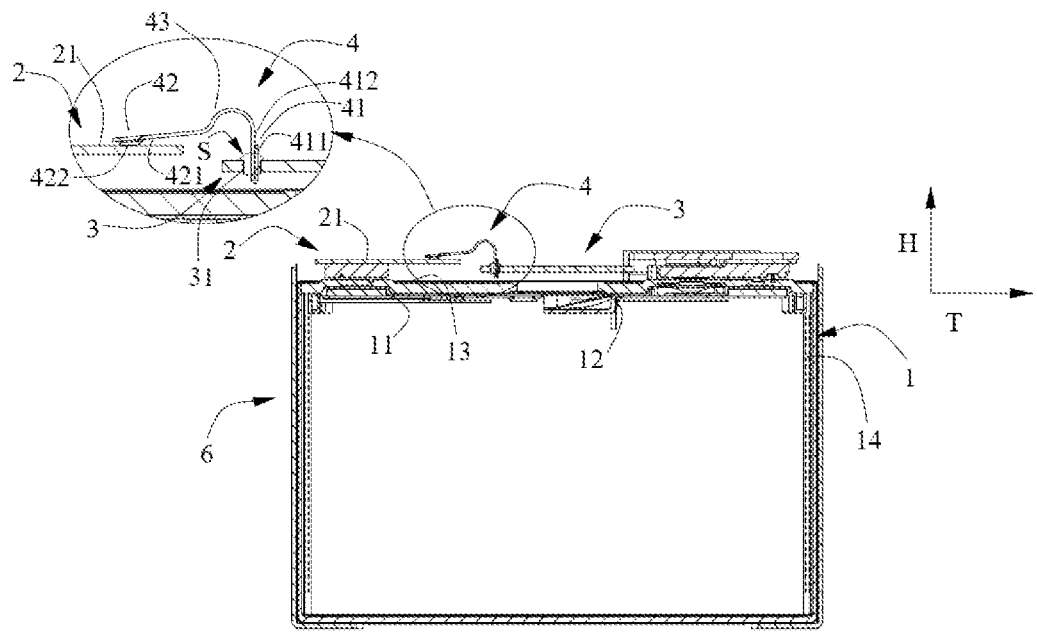
FIG. 3 is a cross-sectional view taken along A-A in FIG. 2.

With reference to FIGS. 1 to 3, the buffer portion 43 bends and extends downward from the fixing portion 41 toward the electrical connecting piece 2, so that to make the contact portion 42 press against the electrical connecting piece 2 more reliably and keep in contact with the electrical connecting piece 2 by the effect of the buffer portion 43 on the contact portion 42, so as to make the sampling stable. The buffer portion 43 can also bend from the fixing portion 41 toward the electrical connecting piece 2 and extend parallel or approximately parallel to the electrical connecting piece 2 to increase the contact area between the contact portion 42 and the electrical connecting piece 2 so as to make sampling more accurate.

With reference to FIGS. 1 to 4, at least a portion of the buffer portion 43 bends into an arc shape that protrudes outward in a direction away from the circuit board 3, so as to increase the downward pressure that the contact portion 42 applies to the electrical connecting piece 2. At least a portion of the buffer portion 43 can also bend into an arc shape that protrudes inward in a direction approaching to the circuit board 3. The bending direction and the structural shape of the bending portion of the buffer portion 43 are not limited. For example, the buffer portion 43 may bend into a wave shape.

The embodiments of the present disclosure further provide an apparatus, which includes a battery module according to any of the embodiments as described above, wherein the battery module is adapted to provide power for the apparatus. The apparatus may be an electric vehicle, a hybrid vehicle, an electric scooter, an electric cart or any other suitable devices which can include the battery module as their own power source.

The above detailed description describes a number of exemplary embodiments, but is not intended to limit the explicitly disclosed combinations. Therefore, unless otherwise stated, the various features disclosed herein can be combined together to form multiple additional combinations that are not shown for the purpose of brevity.

The foregoing descriptions are only preferred embodiments of the present application, and are not intended to limit the present application. For those skilled in the art, the present application may have various modifications and changes. Any modification, equivalent replacement, improvement, or the like made within the spirit and principle of this application may fall within the protection scope of this application.

What is claimed is:

1. A battery module, comprising a plurality of batteries, an electrical connecting piece, a circuit board and a sampling connecting member;

the plurality of batteries being arranged in a longitudinal direction;

the electrical connecting piece being electrically connected to the corresponding battery;

the circuit board being located above the corresponding battery in a height direction; the sampling connecting member being connected to the electrical connecting piece and the circuit board; and the sampling connecting member comprises a fixing portion and a contact portion, the fixing portion being fixed on the circuit board, the contact portion being connected to the fixing portion, and the contact portion pressing against the electrical connecting piece and keeping in contact with the electrical connecting piece.

2. The battery module according to claim 1, wherein the contact portion presses against an upper surface of the electrical connecting piece in the height direction.

3. The battery module according to claim 1, wherein the sampling connecting member further includes a buffer portion, the buffer portion is connected between the fixing portion and the contact portion, and the buffer portion bends and extends from the fixing portion toward the electrical connecting piece.

4. The battery module according to claim 3, wherein the buffer portion obliquely bends down and extends from the fixing portion toward the electrical connecting piece.

5. The battery module according to claim 3, wherein at least a portion of the buffer portion bends into an arc shape that protrudes outward in a direction away from the circuit board.

6. The battery module according to claim 1, wherein a lower surface of the contact portion in the height direction forms a first protrusion protruding downward, and the first protrusion is in contact with the electrical connecting piece.

7. The battery module according to claim 3, wherein the fixing portion comprises a fixing segment and a connecting segment, the connecting segment is located between the buffer portion and the fixing segment, and a thickness of the fixing segment in a circumferential direction is greater than a thickness of the connecting segment in the circumferential direction.

8. The battery module according to claim 7, wherein the fixing segment extends from the connecting segment and folds back in the height direction.

9. The battery module according to claim 7, wherein the fixing segment forms a second protrusion protruding downward.

10. The battery module according to claim 9, wherein,
the circuit board is configured with a through hole penetrating in the height direction; the second protrusion of the fixing portion is inserted and fixed in the through hole of the circuit board.

* * * * *